Patented Dec. 7, 1937

2,101,649

UNITED STATES PATENT OFFICE 2,101,649

XANTHATES OF UNSATURATED SECONDARY ALCOHOLS AND PROCESS FOR THEIR PREPARATION

Herbert P. A. Groll, Berkeley, Calif., assignor to Shell Development Company, San Francisco, Calif., a corporation of Delaware No Drawing. Application February 27, 1937, Serial No. 128,227

20 Claims. (Cl. 260—99.11)

This invention relates to a process for the production of useful unsaturated xanthates which comprises reacting an unsaturated secondary alcohol with carbon disulphide and a basic metal or basic ammonium compound.

The invention also relates to novel xanthates of unsaturated secondary alcohols, which novel unsaturated xanthates are adapted to a wide variety of commercial uses. They are particularly useful as promoters or collecting agents in froth flotation operations for the recovery of minerals from ores, as accelerators for use in the vulcanization of rubber, as insecticides, as penetrating or "wetting out" agents in mercerizing or otherwise treating fibrous material of natural or synthetic origin such as textile fibers or fabrics, paper, leather, felt, and the like, and as agents in numerous other commercial processes.

The general reaction involved in the process of the invention may be illustrated by the following equation representing the reaction of methyl vinyl carbinol, a typical unsaturated secondary alcohol, with carbon disulphide and potassium hydroxide, a representative suitable basic compound:

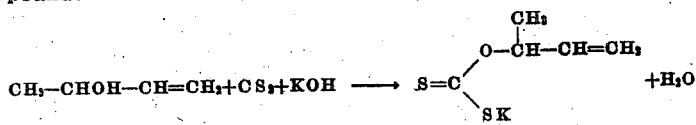

The alcohols from which the novel xanthates are prepared in accordance with the process of the invention are unsaturated secondary alcohols, that is, unsaturated alcohols containing at least one —CHOH— group linked to two other carbon atoms. Such unsaturated secondary alcohols may contain one or a plurality of unsaturated bonds, and the unsaturated bonds may be double bonds (olefinic linkages) or triple bonds (acetylenic linkages). A preferred group of unsaturated secondary alcohols are those possessing at least one olefinic linkage between two carbon atoms of aliphatic character. The unsaturated secondary alcohols may be symmetrical or asymmetrical, and they may be of straight chain, branched chain, alicyclic or mixed character.

Suitable unsaturated secondary alcohols may be represented by the general formula

R—CHOH—R₁, wherein R represents an organic radical of straight chain, branched chain or alicyclic character containing at least one olefinic or acetylenic linkage between two carbon atoms of aliphatic character, and R₁ represents a saturated organic radical of alkyl, aralkyl or cyclic character which may or may not be further substituted, or an unsaturated organic radical which may or may not be further substituted and which may or may not be the same as the unsaturated organic radical represented by R. The unsaturated secondary alcohols may be monohydric or polyhydric; it is only essential that they possess at least one —CHOH— group and at least one olefinic or acetylenic linkage between two aliphatic carbon atoms in their molecules.

One preferred subgroup of unsaturated secondary alcohols embraces those alcohols of the formula R—CHOH—R₁, wherein R represents a straight chain alkenyl radical, that is, a straight chain organic radical containing an olefinic linkage between two aliphatic carbon atoms, and R₁ represents any organic radical, which may be the same or different than R, such as an alkyl, alkenyl, aralkenyl, aryl or alicyclic radical which may or may not be further substituted by suitable organic or inorganic substituents such as hydroxy groups, alkoxy groups, halogen atoms, etc. It is, of course, to be understood that a hydroxy group, alkoxy group or halogen atom will not be linked to the carbon atom linked to the secondary carbinol group, and that a hydroxy group will not be linked to an unsaturated carbon atom in either of the radicals.

Another preferred subgroup of unsaturated alcohols embraces those possessing at least one tertiary carbon atom, preferably an unsaturated tertiary carbon atom, in their structure. An unsaturated tertiary carbon atom is a carbon atom linked to three carbon atoms; it is linked by a double bond to one carbon atom and by single bonds to two other carbon atoms. The unsaturated tertiary carbon atom may be linked directly to the carbinol group or it may be once, or more than once, removed from the carbinol group. Excellent results have been obtained with those unsaturated alcohols possessing an unsaturated tertiary carbon atom linked to the secondary carbinol group, as well as with those unsaturated secondary alcohols containing an unsaturated tertiary carbon atom once or more than once removed from the carbinol group.

The unsaturated secondary alcohols which possess an aliphatic unsaturated carbon atom linked directly to the secondary carbinol group are of the allyl type. Methyl vinyl carbinol (CH₃—CHOH—CH=CH₂) and methyl isopropenyl carbinol

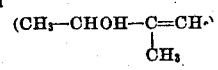

are representative allyl type secondary alcohols.

The following are representative unsaturated secondary alcohols which may be converted to valuable and novel unsaturated xanthates in accordance with the process of the invention:

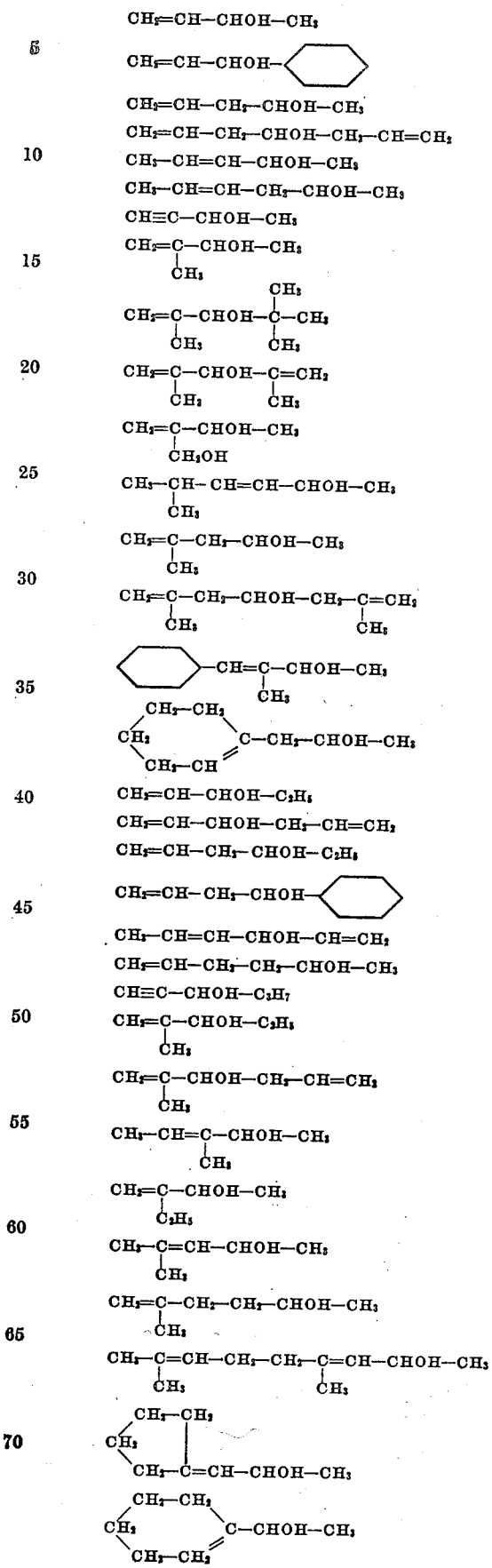

and the like and their homologues, analogues and suitable substitution products.

Unsaturated secondary alcohols from any source may be used. Mixtures comprising a plurality of unsaturated alcohols one or more of which may be unsaturated secondary alcohols may be treated and mixtures of the corresponding unsaturated xanthates obtained.

Preferably employed basic compounds are the metal hydroxides and ammonium hydroxide, particularly the alkali metal hydroxides. For the purposes of the present invention, ammonium hydroxide is, due to its similarity in action to the alkali metal hydroxides, classed with the alkali metal hydroxides.

The reaction may be effected in any suitable type of apparatus. For example, the unsaturated secondary alcohol, the carbon disulphide, the basic hydroxide, and, if desired, a suitable solvent for any one or all of the reactants may be charged in any suitable manner to a reaction vessel of appropriate size and shape, which is preferably provided with suitable heating and cooling means, means for agitating its contents as by mechanical stirring means, suitable inlet means, suitable means for removal of the product, and a reflux condenser for preventing loss of carbon disulphide or other volatile constituents of the reaction mixture due to the heat developed during the reaction and/or applied. The order of introduction of the reactants is immaterial. If desired, the proper proportions of the unsaturated alcohol and the hydroxide may be charged to the reaction vessel and the carbon disulphide then added in the required amount, slowly or all at once, while stirring the reaction mixture and maintaining the desired reaction temperature. On the other hand, the desired proportions of the unsaturated alcohol and the carbon disulphide may be charged to the reaction vessel and the hydroxide then added, or the reactants may be charged to the reaction vessel simultaneously in the desired proportions. Any excess of any one or two of the reactants may be employed. By employing an excess of the carbon disulphide and/or the unsaturated alcohol, if it is sufficiently volatile, the maintenance of the desired reaction temperature may be facilitated or even automatically controlled by the vaporization of said excess. The vaporized excess may be condensed and recycled while stoichiometric amounts of the reactants are being charged to the reaction vessel continuously.

The invention may be executed in the presence of a fluid material, which serves as a solvent or diluent or to aid in maintaining the desired reaction temperature, substantially chemically inert to the reactants and products. Suitable substantially inert fluids for these purposes are the paraffin hydrocarbons as propane, butane, pentane, etc., the chlorinated paraffin hydrocarbons, hydrocarbon mixtures, the olefines, benzene, toluene, kerosene, gasoline, etc., and the oxy-compounds as the ethers, ketones, esters, etc.

The metal hydroxide may be applied in any convenient form, for example, in the solid state as a powder, as granules, as pellets, etc., or it may be applied as a solution in water or as a solution or suspension in the unsaturated secondary alcohol and/or some substantially inert solvent or medium therefor. Part of the metal hydroxide may be dissolved in the unsaturated alcohol to form a saturated solution, and, if more hydroxide than can be dissolved in the unsaturated alcohol is required, the additional hydroxide may be added as a solid, or dissolved in water, or dissolved or suspended in some other inert liquid.

As an alternative mode of procedure, the process may be executed by reacting the carbon disulphide with a preformed alcoholate of an unsaturated secondary alcohol. The unsaturated secondary alcoholate may be prepared in any suitable manner, for example, by reacting the unsaturated alcohol with a metal such as the alkali metals, or with a metal hydroxide. The alcoholate may be applied as a solid or dissolved or suspended in a suitable solvent or media therefor. The unsaturated secondary alcoholates are conveniently applied in solution in an excess of the corresponding unsaturated secondary alcohol.

The reaction to form an unsaturated secondary alcohol xanthate is, in the majority of cases, accompanied by the liberation of heat. When the liberated heat is not sufficient to maintain the desired reaction temperature, extraneous heat may be applied. In other cases, it may be desirable to resort to cooling means to maintain the desired temperature. The invention is preferably executed in the temperature range of from about 10° C. to about 35° C., but higher or lower temperatures may be used if desired. The process may be executed under subatmospheric, atmospheric or superatmospheric pressure.

The process is adaptable to a batch, intermittent or continuous mode of operation. When operating in a continuous manner, the partially or substantially completely reacted mixture may be continuously withdrawn from the reaction stage or stages and conducted to a communicating separation stage or stages wherein the xanthate in solution and/or suspension in the excess of unsaturated alcohol and/or carbon disulphide and/or added solvent or diluent, if present, may be separated therefrom and the unreacted reactants and/or solvents or diluents conducted back to a reaction stage or stages for reutilization.

The unsaturated xanthate may be recovered from the reaction mixture discharged from the reaction vessel in a variety of suitable manners. If solid xanthate is present, it may be separated from the liquid reactants and/or solvents or diluents by filtration, evaporation, centrifugation and like means. For example, when an excess of the unsaturated secondary alcohol is used, the xanthate may be recovered from its solution in the alcohol by distilling off the alcohol at atmospheric or reduced pressure, or by resorting to the use of any of the known crystallizing methods.

I have discovered a practicable and very effective method of obtaining crystalline xanthates in a substantially pure state. The solid xanthates obtained as such in the execution of the process, or crystallized or precipitated from an excess of either or both of the reactants, are many times contaminated with undesirable side-reaction products, solid hydroxide and the like. These undesirable contaminants may be removed and a substantially pure crystalline xanthate product obtained by dissolving the crude xanthate product in a substantially inert organic solvent therefore, such as a ketone, and precipitating the dissolved xanthate from said solvent. In other cases, the xanthate product may be initially obtained as a more or less gelatinous mass instead of in the preferred crystalline form. Such crude gelatinous xanthate products may, in accordance with my novel purification procedure, be dissolved in a suitable organic solvent therefore, and the substantially pure xanthate in crystalline form precipitated therefrom. Suitable organic solvents for this purpose are the carbonylic compounds, particularly the ketones. Suitable ketones may be of symmetrical or mixed character. The following are representative suitable ketones: acetone, methyl ethyl ketone, diethyl ketone, methyl propyl ketone, ethyl propyl ketone, methyl isopropyl ketone, dipropyl ketone, methyl butyl ketone, methyl allyl ketone, methyl methallyl ketone and the like and their homologues, analogues and suitable substitution products.

The xanthate or mixture of xanthates may be dissolved in the ketone with heating if desired, and some of the xanthate precipitated on cooling of the solution, the remainder being recovered from the solution by methods hereinafter described. In a preferred mode of procedure, the crude xanthate is dissolved in the ketone at about room temperature, the saturated solution is filtered to separate any undissolved solid material, and the xanthate is precipitated from the filtrate by adding thereto an organic liquid which is miscible with the ketone but in which the xanthate is substantially insoluble. Suitable organic liquids for the purpose are the liquid paraffin hydrocarbons as pentane, isopentane, the hexanes, the heptanes, the octanes, etc., the halogenated paraffins, the liquid olefines, benzene, kerosene, gasoline, etc. Other modes of separating the dissolved xanthate from the ketone or other solvent solution are suitable. For example, the xanthate may be precipitated by removing the solvent from the solution by distillation or evaporation, such as by passing an inert gas therethrough, etc. The precipitated xanthate may be separated from the solution by filtration, centrifugation and like means.

The unsaturated xanthates may or may not contain water of crystallization, depending upon the particular xanthate and the mode of preparation adopted. If xanthates containing water of crystallization are obtained, and a water-free salt is desired, the water may be driven off by suitable heat treatment, such as by passing a current of warm air over or through the material.

The following specific examples illustrate suitable modes of executing the invention. It is to be understood that the examples are for illustrative purposes only and that the invention is not to be regarded as limited to the specific reactants, conditions, or modes of operation therein described.

Example I

An excess of powdered potassium hydroxide was added to about 105 c. c. of methyl vinyl carbinol ($CH_3-CHOH-CH=CH_2$) and the mixture stirred and heated for a short time at about 60° C. to effect solution of the potassium hydroxide. The mixture was cooled to room temperature and filtered to remove the undissolved potassium hydroxide. The filtrate contained about 0.16 mol. of the hydroxide.

About 100 c. c. of the unsaturated alcohol-hydroxide solution was charged to a suitable reaction vessel provided with a mechanical stirrer, a reflux condenser and cooling means. The solution was stirred and maintained at a temperature of from about 20° C. to 22° C. while about 0.20 mol. of carbon disulphide was added. The xanthate formed almost at once.

When the reaction was substantially complete, the mixture was discharged from the reaction vessel and filtered to remove the solid xanthate. The solid material was washed three times with dry ether, and the ether removed by evaporation under reduced pressure. The product, a light yellow crystalline solid of substantial purity, was the novel potassium xanthate of methyl vinyl carbinol.

*Example II*

About 100 grams (1.78 mols) of powdered potassium hydroxide were dissolved in about 900 grams (7.0 mols) of a mixture of iso-octenols containing a large proportion of the secondary iso-octenol of the formula $$CH_2=C-CHOH-C(CH_3)_3$$
$$|$$
$$CH_3$$

and obtained by hydrolyzing a mixture of chlorinated diisobutylenes. This solution was charged to a reaction vessel as described in Example I and stirred and maintained at about room temperature while about 163 grams (2.14 mols) of carbon disulphide were added.

When the reaction was substantially complete, the precipitate was separated from the reaction mixture by filtration, washed with ether several times, and the ether removed under vacuo. About 1.6 mols of an unsaturated xanthate containing a large proportion of the potassium xanthate of secondary iso-octenol was obtained.

*Example III*

About 10 grams of methyl isobutenyl carbinol

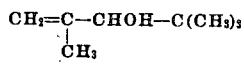

were dissolved in about 200 c. c. of dry ethyl ether and the mixture charged to a reaction vessel equipped with a mechanical stirrer and a reflux condenser. This mixture was stirred while about 3.8 grams of potassium metal, in the form of small pieces, were added, the temperature being kept below about 25° C. to minimize decomposition. When all of the potassium had reacted, an excess of carbon disulphide was added to the stirred mixture slowly while maintaining the temperature at from about 23° C. to 25° C. A voluminous gelatinous precipitate was formed.

The precipitate was removed by filtration, washed twice with dry ether, and dried in a vacuum desiccator. The crude dried product, containing about 91% by weight of the potassium xanthates of methyl isobutenyl carbinol, was dissolved in acetone at about room temperature. The acetone solution was filtered to remove solid material. Isopentane was then added to the filtrate and the substantially pure unsaturated xanthate precipitated.

The novel unsaturated xanthates may be represented by the general formula

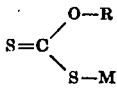

wherein R represents the radical of an unsaturated secondary alcohol, and M represents a metal radical or the ammonium radical. When M is a polyvalent metal, a plurality of

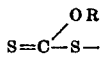

radicals may be linked thereto. In a preferred group of the novel unsaturated xanthates, M represents an alkali metal or the ammonium radical.

While I have described my invention in a detailed manner and provided specific examples illustrating suitable modes of executing the same it is to be understood that modifications may be made and that no limitations other than those imposed by the scope of the appended claims are intended.

This application is a continuation-in-part of my application, Serial No. 654,253, filed January 30, 1933.

I claim as my invention:

1. A process for the production of an unsaturated xanthate which comprises providing a mixture of an unsaturated secondary alcohol, carbon disulphide and a basic metal hydroxide, and causing reaction to take place resulting in formation of a metal xanthate of the unsaturated secondary alcohol.

2. A process for the production of an unsaturated xanthate which comprises providing a mixture of an unsaturated secondary alcohol, carbon disulphide and an alkali metal hydroxide, and causing reaction to take place resulting in the formation of an alkali metal xanthate of the unsaturated secondary alcohol.

3. A process for the production of an unsaturated xanthate which comprises reacting an unsaturated secondary alcohol with carbon disulphide and a basic metal hydroxide in the presence of water.

4. A process for the production of an unsaturated xanthate which comprises reacting an unsaturated secondary alcohol containing at least one olefinic linkage between two aliphatic carbon atoms with carbon disulphide and an alkali metal hydroxide.

5. A process for the production of an unsaturated xanthate which comprises reacting a mono-olefinic secondary alcohol with carbon disulphide and an alkali metal hydroxide.

6. A process for the production of an unsaturated xanthate which comprises reacting an unsaturated secondary alcohol containing at least one olefinic linkage between two aliphatic carbon atoms with carbon disulphide and an alkali metal hydroxide in the presence of a thermally responsive liquid which is volatile and substantially inert under reaction conditions.

7. A process for the production of an unsaturated xanthate which comprises reacting a metal alcoholate of an unsaturated secondary alcohol with carbon disulphide.

8. A process for the production of an unsaturated xanthate which comprises reacting an alkali metal alcoholate of an unsaturated secondary alcohol containing at least one olefinic linkage between two aliphatic carbon atoms with carbon disulphide.

9. A process for the production of a substantially pure unsaturated xanthate which comprises providing a mixture of an unsaturated secondary alcohol, carbon disulphide and an alkali metal hydroxide, causing reaction to take place resulting in the formation of an alkali metal xanthate of the unsaturated secondary alcohol, separating the crude unsaturated xanthate from the reaction mixture, dissolving the crude xanthate in a ketone, separating undissolved solid material from the ketone solution, treating the ketone solution to precipitate the unsaturated xanthate therefrom, and separating the substantially pure unsaturated alkali metal xanthate from the ketone.

10. In a process for the production of a substantially pure unsaturated xanthate by reacting an unsaturated secondary alcohol with carbon disulphide and an alkali metal hydroxide, the steps of purifying the resulting unsaturated xanthate which comprise dissolving the crude unsaturated xanthate in a ketone, filtering the resulting ketone solution to separate undissolved solid material therefrom, adding to the ketone solution a sufficient amount of an inert organic liquid substantially miscible with the ketone but in which the unsaturated xanthate is substantially immiscible to precipitate the unsaturated xanthate, and separating the precipitated substantially pure unsaturated xanthate.

11. In a process for the production of a substantially pure unsaturated xanthate by reacting an unsaturated secondary alcohol with carbon disulphide and an alkali metal hydroxide, the steps of purifying the resulting unsaturated xanthate which comprise dissolving the crude unsaturated xanthate in acetone, filtering the acetone solution to remove undissolved solid material, adding a sufficient amount of a pentane to the acetone to precipitate the dissolved unsaturated xanthate, and separating the substantially pure unsaturated xanthate.

12. In a process for the production of a substantially pure unsaturated xanthate by reacting an alkali metal alcoholate of an unsaturated secondary alcohol with carbon disulphide, the steps of purifying the resulting unsaturated xanthate which comprises dissolving the crude unsaturated xanthate in acetone, filtering the acetone solution to separate undissolved solid materials therefrom, adding a sufficient amount of a pentane to the acetone to precipitate the dissolved unsaturated xanthate, and separating the substantially pure unsaturated xanthate.

13. A xanthate of an unsaturated secondary alcohol.

14. A metal xanthate of an unsaturated secondary alcohol.

15. An alkali metal xanthate of an unsaturated secondary alcohol containing at least one olefinic linkage between two aliphatic carbon atoms.

16. An alkali metal xanthate of an aliphatic mono-olefinic monohydric secondary alcohol.

17. A xanthate of methyl vinyl carbinol.

18. The potassium xanthate of methyl vinyl carbinol.

19. A xanthate of methyl isobutenyl carbinol.

20. The potassium xanthate of methyl isobutenyl carbinol.

HERBERT P. A. GROLL.